United States Patent [19]
Sano et al.

[11] Patent Number: 5,109,456
[45] Date of Patent: Apr. 28, 1992

[54] OPTICAL FIBER UNIT

[75] Inventors: Hiroaki Sano; Yoshiaki Terasawa; Shigeru Tanaka, all of Kanagawa, Japan

[73] Assignee: Sumitomo Electric Industries, Ltd., Osaka, Japan

[21] Appl. No.: 666,143

[22] Filed: Mar. 7, 1991

[30] Foreign Application Priority Data

Mar. 15, 1990 [JP] Japan .................................. 2-62748

[51] Int. Cl.$^5$ .............................................. G02B 5/172
[52] U.S. Cl. ..................................................... 385/100
[58] Field of Search ........................................ 350/96.23

[56] References Cited

U.S. PATENT DOCUMENTS

| | | | |
|---|---|---|---|
| 3,660,590 | 5/1972 | Conant | 350/96.23 X |
| 4,147,406 | 4/1979 | Anderson | 350/96.23 |
| 4,389,088 | 6/1983 | Trezequet | 350/96.23 |
| 4,865,415 | 9/1989 | Kitayama | 350/96.23 |

Primary Examiner—Akm Ullah
Attorney, Agent, or Firm—Cushman, Darby & Cushman

[57] ABSTRACT

An optical fiber unit including a plurality of sub-units. Each sub-units includes a plurality of optical fibers. Further, the sub-units are twisted together, with a twist pitch in the range of from 30 to 600 mm. Each group of optical fibers are coated with a primary layer to form a sub-unit. The sub-units are then twisted together and coated by a secondary coating. A porous layer is applied onto the secondary layer, thus forming the optical fiber unit.

8 Claims, 4 Drawing Sheets

OPTICAL FIBER UNIT

BACKGROUND OF THE INVENTION

1. Field of the Invention

The present invention relates to an optical fiber unit which is suitable for use in a laying method of a fluid pressure-sending system such as an air blown fiber method or other such systems.

2. Description of the Prior Art

The air blown fiber method, a new method for laying a communication line material, is disclosed, for example, in Japanese Patent Unexamined Publication No. Sho-59-104607. In such a method, a pressure-sending device 31 as shown in FIG. 5 is used. In this device, a communication line material is pressure-sent and advanced forward into a previously laid duct line 32 by means of an air flow so as to be laid in duct line 32. In FIG. 5, the reference numeral 34 designates a feed head to be attached to an end portion of duct line 32, and reference numerals 35 and 36 are driving wheels for sending communication line material 33 into duct line 32. Numeral 37 illustrates an air leading inlet for leading air for pressure-sending the communication line material 33. An air seal 38 prevents air from leaking through an inlet portion for communication line material 33 in feed head 34. Air seal 38 is provided because duct line 32 is so long that pressure loss is large.

It is necessary that communication line material 33 used in such a method is made lightweight with a large surface area so as to be suitable for pressure-sending by means of an air flow. Conventionally, communication line material, (an optical fiber unit) to be laid according to the above-described method, is optical fiber units as shown in FIGS. 6 and 7 have been used.

Optical fiber unit 40 shown in FIG. 6 is composed of seven optical fibers 41 which are bundled with primary coating 42 made of polypropylene. Primary coating 42 is further coated with a porous layer 43 made of foam polyethylene. The optical fiber unit is reduced in weight and increased in surface area due to the provision of porous layer 43.

Optical fiber unit 50 shown in FIG. 7 is composed of four sub-units 53 each of which is constituted by a pair of optical fibers 51 coated with a primary coating 52. Sub-units 53 are arranged on the circumference of interposition quadrat 54. A secondary coating 55 is applied on the periphery of sub-units 53 and the interposition quadrat 54, and a porous layer 56 that reduces the weight of optical fiber unit 50 and increases the surface area of fiber unit is then applied on the secondary coating 55.

As described above, in conventional optical fiber units 40 and 50 applied to the air blown fiber method, the number of optical fiber cores was small (the number of optical fiber cores being seven or eight), and the optical fibers were gathered in a straight state. Accordingly, these optical fiber units have the following advantages.

(1) Since the number of optical fiber cores is small, there is little distortion of optical fibers even if they are laid in a curved duct line.

(2) Since optical fibers were gathered in a straight state, the drag acting in the longitudinal direction is large. Accordingly, the communication line material 33 can be sent smoothly by the large drag when the communication line material 33 (for example, the optical fiber unit 40 or 50) is sent into the high-pressure duct line 32 while being pinched by the driving wheels 35 and 36 as shown in FIG. 5.

(3) Since optical fibers are arranged straight, manufacturing is relatively simple.

Because the quantity of information transmission has recently increased, it is desirable to enlarge the capacity of optical fiber units such as those described above. That is, it is desirable to maximize the number of optical cores contained in an optical fiber unit. However, when a straight-arranged optical fiber unit, in which the number of optical fiber cores is large (not less than nine), is manufactured, the following problems occur.

(1) Since the number of optical fiber cores is large, distortion of arrangement is caused.

(2) As the number of cores is increased so that the diameter of the optical fiber unit becomes large, a negative influence of distortion due to bending of the optical fiber unit occurs. This problem is remarkable particularly in the state in which transmission loss increases at a time of low temperature. Such an increase of transmission loss at a time of low temperature is caused by shrinkage of the outer porous layer concentrated only in part on the number of optical fibers. Accordingly, the transmission characteristic becomes different depending on the position of arrangement of the optical fibers, thereby making it impossible to attain homogeneous transmission.

(3) Since the optical fiber unit becomes high in rigidity and even though the drag required in sending the optical fiber unit is sufficient, there is a possibility that the optical fiber unit is difficult to bend along a curve of a duct line having a curved portion. This makes it difficult to lay the optical fiber unit in a previously laid duct line.

SUMMARY OF THE INVENTION

In view of the prior art described above, it is an object of the present invention to provide an optical fiber unit which has a number of optical cores while maintaining a good transmission characteristic and ease of laying.

In order to solve the problems described above, according to the present invention, the optical fiber unit, led and pushed forward into a previously laid duct line by means of a flow of fluid pressure-sent into the duct line, comprises a plurality of sub-units each of which is formed of a plurality of optical fibers gathered and coated with a primary coating. The plurality of sub-units are twisted and coated with a secondary coating, and the secondary coating is further coated with a porous layer.

Since the number of optical fiber cores is increased, the capacity of transmission is increased while the drag required at the time of send-in is sufficient. Further, since the sub-units are twisted, the optical fiber unit is flexible and external force is dispersed so that the transmission characteristic is improved.

BRIEF DESCRIPTION OF THE DRAWING

Other objects, features and characteristics of the present invention, as well as the methods of operation and function of the related elements of the structure, and to the combination of parts, will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENT

Figure 1A:
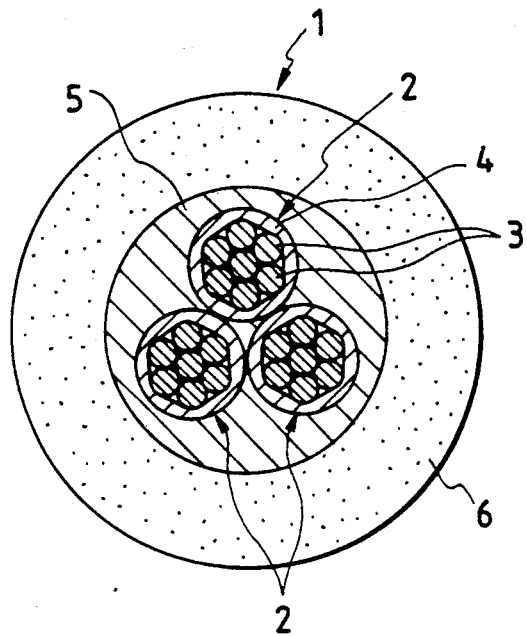
FIG. 1(a) is a sectional view showing a first embodiment of the present invention.
Figure 1B:
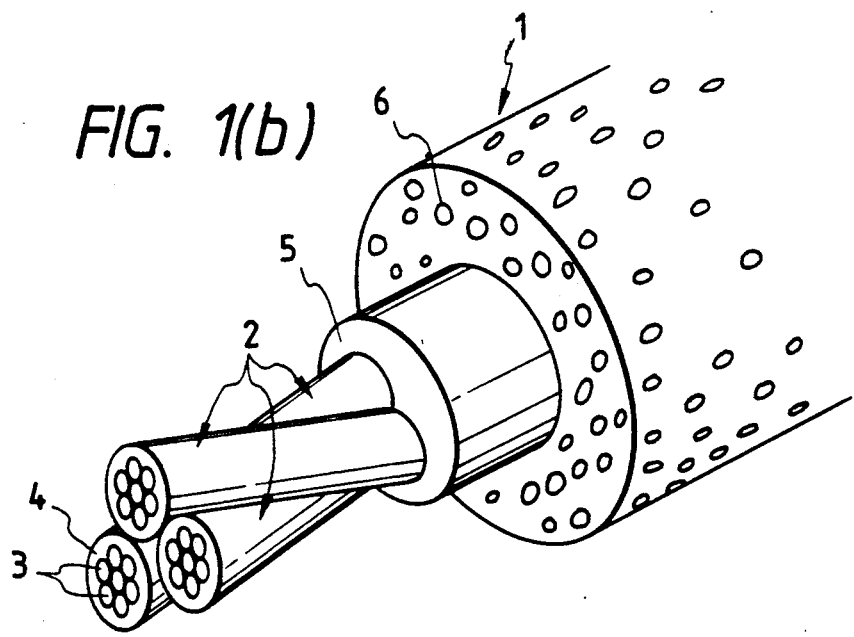
FIG. 1(b) is an exploded perspective view showing the first embodiment.

FIGS. 1(a) and 1(b) depict an optical fiber unit 1 which is a first embodiment of the present invention. Each of three sub-units 2 is constituted by seven multi-mode optical fibers 3 which are gathered so that six optical fibers are arranged around one central optical fiber, the seven gathered optical fibers 3 being coated with primary coating 4 made of nylon. The three sub-units 2 having such a configuration as described above are twisted, and the twisted sub-units 2 are coated with a secondary coating 5 made of ultraviolet setting resin (950×042, made in the U.S.). The twist pitch of the sub-units 2 is selected to be 30–600 mm as a result of a comparative test which will be described later. A porous layer 6 of foam polyethylene is applied onto the secondary coating 5. Thus, the optical fiber unit 1 is constituted by twenty one optical fiber cores. Of course, other configurations of optical fiber cores are possible.

For the following reasons, the thus arranged optical fiber unit 1 of this embodiment can ensure a good transmission characteristic even at times of low temperature, and can be pressure-sent in good condition even if the optical fiber unit 1 is laid in a curved duct line.

(1) The number of optical fiber cores gathered in each of the sub-units 2 is small (although the number of cores is seven in the embodiment, the number may desirably be selected to be within a range of from three to seven), and each sub-unit 2 per se is smaller in diameter than that of a conventional optical fiber unit and resistant against bending.

(2) Because the number of optical fiber cores in each of the sub-units 2 is small, the optical fibers 3 are gathered tightly by the primary coating 4. Accordingly, the optical fibers 3 are neither separated from the primary coating 4 nor loosened within the primary coating 4 so as not to bend non-steadily.

(3) Since three sub-units 2 are twisted with a suitable pitch (30–600 mm) so that the whole of optical fiber unit 1 can bend easily and suitably, a good pressure-sending characteristic can be obtained even in a curved duct line.

(4) As sub-units 2 are twisted, even if porous layer 4 shrinks at the time of low temperature, the shrinking force (force toward the radial center) is shared among the sub-units 2 so as to act equally onto all sub-units 2, and the shrinking force is transmitted from sub-units 2 which receive the shrinking force to the other sub-units 2 so that the force is dispersed to all optical fibers 2.

Here, an experiment by which the twist pitch has been determined to be 30-600 mm in the embodiment will be described. In the experiment, seven kinds of optical fiber units (i)–(vii) were used, each having the configuration shown in (a) and (b) of FIG. 1 and with the following properties, and a comparative optical fiber unit (viii). The properties of the optical fiber units (i)–(viii) are as follows.

The optical fiber unit (i): The optical fiber 3 was constituted by a multi-mode glass fiber having a core diameter of 50 $\mu$m and a clad diameter of 125 $\mu$m which was coated with two layers of ultraviolet setting resin so as to have an outer diameter of 250 $\mu$m. The outer diameter of the sub-unit 3 was 1 mm. The outer diameter of the optical fiber unit coated with a porous layer was 4 mm. The twist pitch of the three sub-units 3 was 30 mm. The configurations were as shown in FIGS. 1(a) and 1(b).

The optical fiber units (ii), (iii), (iv), (v), (vi), and (vii): The twist pitches of the three sub-units 3 were 100 mm, 200 mm, 400 mm, 600 mm, 700 mm, and 800 mm respectively, and the other properties were the same as those of the optical fiber unit (i).

The comparative optical fiber unit (viii): Although the members as shown in FIGS. 1(a) and 1(b) were used, the three sub-units 2 were arranged linearly without being twisted.

The eight kinds of the above optical fiber units (i)–(viii) were used in experimentation directed toward (A) the increase in transmission loss when each of the optical fiber units (i)–(viii) was made in the form of a coil having a diameter of 25 cm in the low temperature state, and (B) the characteristic when each of the optical fiber units having a length of 300 mm and wound around a mandrel having a diameter of 25 cm is pressure-sent into a duct line.

The reason why the diameter of each of the optical fiber units was selected to be 25 cm in the experiments (A) and (B) was that the minimum diameter of duct line cables manufactured by Sumitomo Electric Industries, Ltd. which are widely used in Japan was 12 mm, and, generally, optical fiber units are laid so that a bending diameter did not become smaller than the outer diameter not less than 20 times of the diameter of the optical fiber unit.

The increase in transmission loss in the low temperature state in the experiment (A) was measured as changes in transmission loss when a temperature is lowered from a room temperature to $-20°$ C. The reference at that time was 0.1 dB/km.

The transmission characteristic in the experiment (B) was estimated as a time required for inserting each of the optical fiber units (i)–(viii) into a polyethylene duct line having an inner diameter of 6 mm and a length of 500 m by means of air compressed by a pressure of 54 kg/cm$^2$. The reference at that time was 20 minutes.

Figure 2:
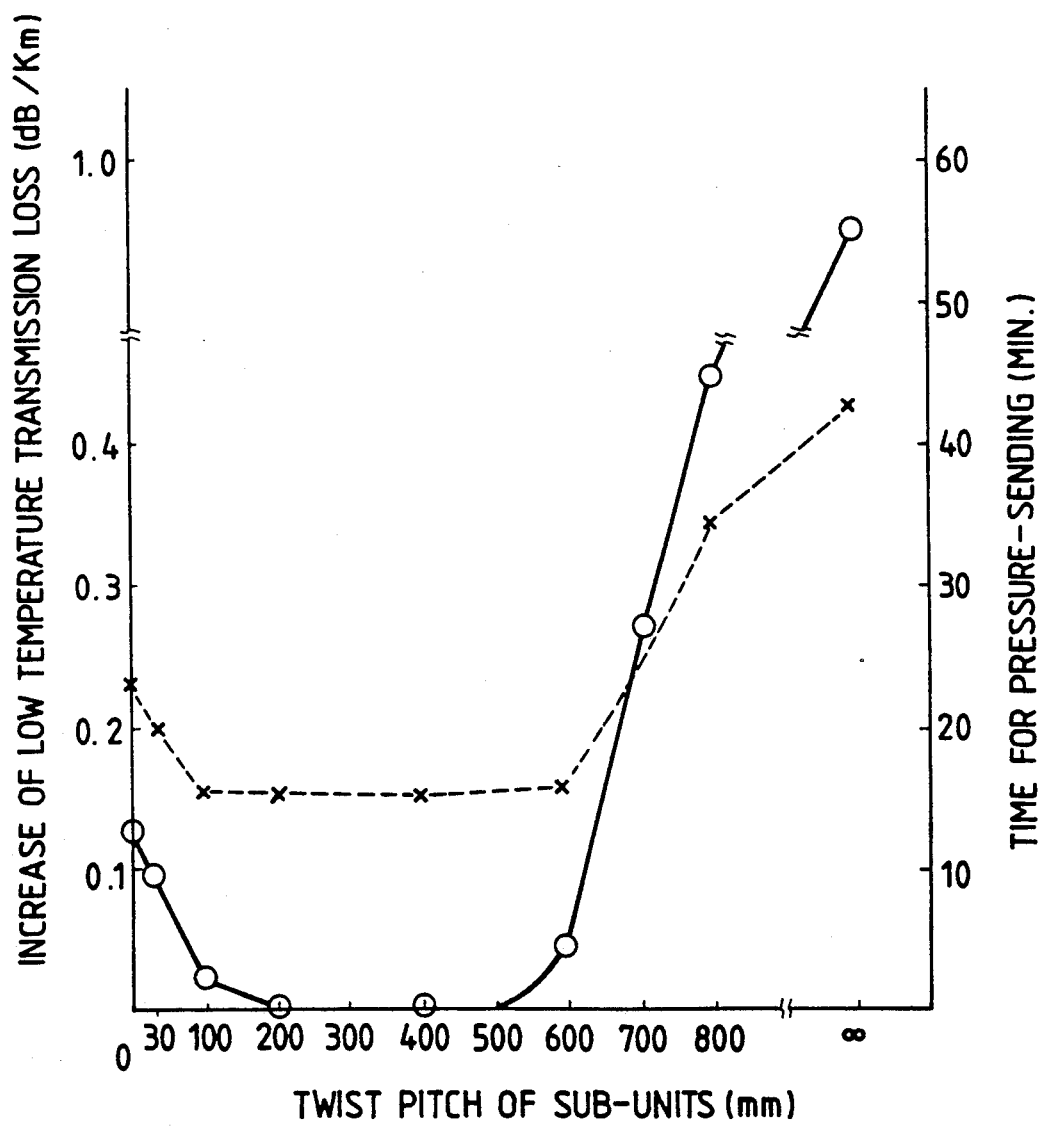
FIG. 2 is a characteristic diagram showing a pressure-sending characteristic and a transmission-loss characteristic of the first embodiment.

FIG. 2 shows the result of experiment (A) (shown by a solid line) and the result of experiment (B) (shown by a dotted line) at the same time. From the characteristic shown in the drawing, it was confirmed that the characteristic remarkably deteriorates at the pitch of twist in a range of from 600 mm to 700 mm. In view of such experimental data, it was found that good transmission and pressure-sending characteristics were obtained when the twist pitch was selected to be 600 mm or less.

Further, in order to obtain another comparative optical fiber unit separately from the above comparative optical fiber unit (viii), twenty-one optical fibers were made straight and gathered as they were, and coating was applied on the twenty-one gathered optical fibers. The optical fibers vibrate within the coating, so that the external appearance of the coating became extremely unstable and the arrangement of the optical fibers was disturbed to thereby deteriorate the manufacturing property. Further, since the abnormality of the appearance of the coating was remarkable, it was impossible to apply a porous layer of polyethylene onto on the above coating by extrusion forming. In view of the above fact, it was confirmed that even if numbers of optical fibers were simply gathered, an optical fiber unit could not be manufactured. In other words, it was found that in order to form a multi-core optical fiber unit, as shown in the embodiment, it was necessary to form a plurality of sub-units each having a small number of optical fibers and to bundle the plurality of sub-units.

Figure 3:
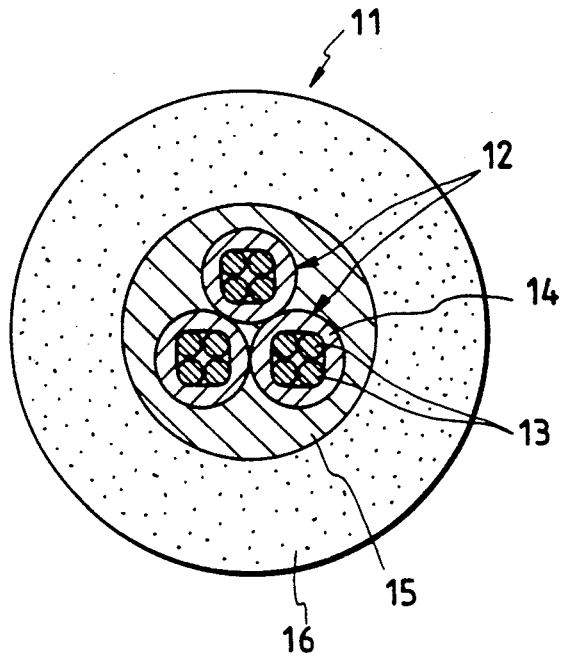
FIG. 3 is a sectional view showing a second embodiment of the present invention.

FIG. 3 shows optical fiber unit 11 of a second embodiment of the present invention. Optical fiber unit 11 is constituted by three sub-units 12 which are twisted. Each sub-unit 12 is constituted by four optical fibers (multi-mode glass optical fibers) 13 which are gathered and coated with a primary coating (nylon) 14. The three sub-units 12 thus twisted are coated with a secondary coating (ultraviolet setting type resin) 15, and the secondary coating 15 is coated with a porous layer (foam polyethylene) 16. The optical fiber unit 11 was manufactured so that the diameter of the primary coating 14 was 0.8 mm$\phi$, the diameter of the secondary coating 15 was 2.0 mm$\phi$, and the outer diameter of the optical fiber unit 11 was 3.6 mm$\phi$.

Figure 4:
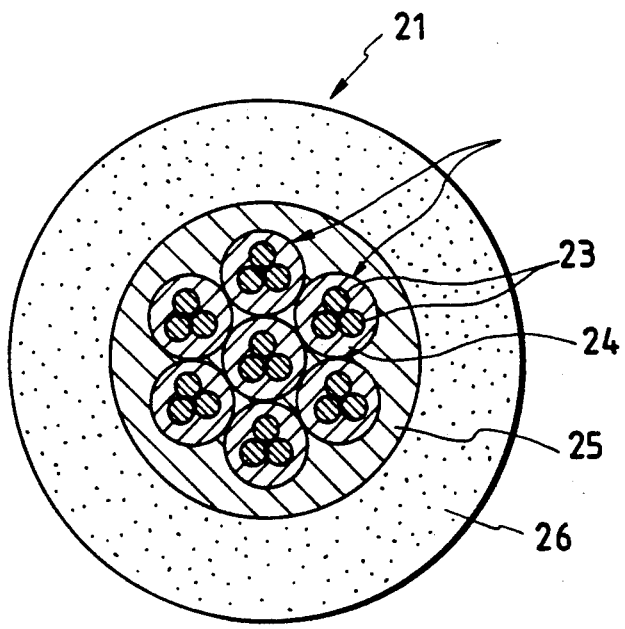
FIG. 4 is a sectional view showing a third embodiment of the present invention.
Figure 5:
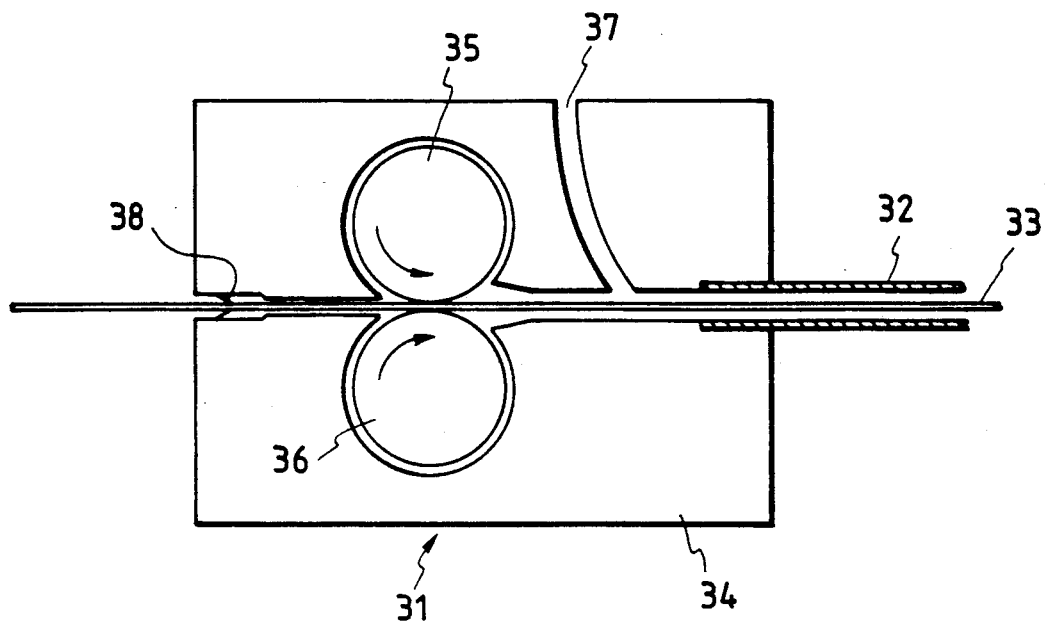
FIG. 5 depicts a known pressure sending device.
Figure 6:
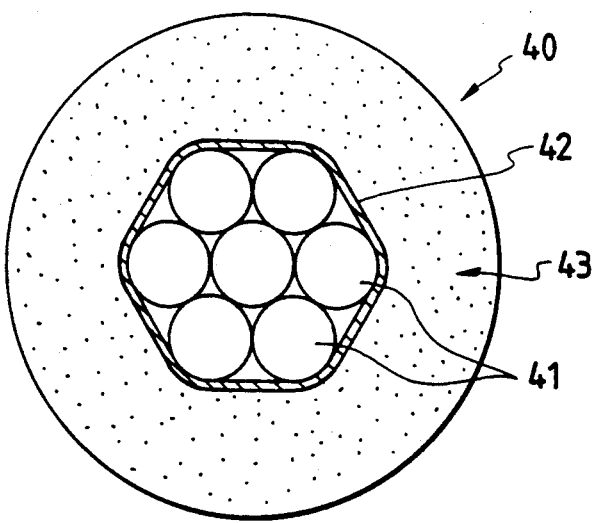
FIGS. 6 and 7 are sectional views showing conventional optical fiber units respectively.
Figure 7:
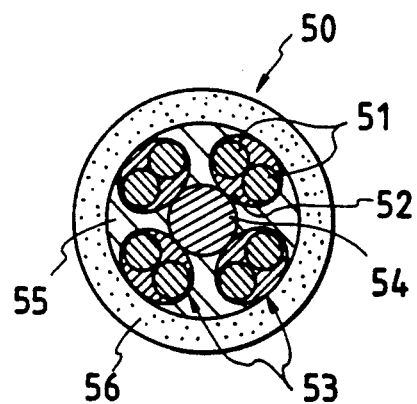

FIG. 4 shows an optical fiber unit 21 of a third embodiment of the present invention. The optical fiber unit 21 is composed of seven sub-units 22 each constituted by three optical fibers (multi-mode glass optical fibers) 23 gathered and coated with a primary coating (nylon) 24. The sub-units 22 are arranged so that one central sub-unit is surrounded by six other sub-units, while the six outer sub-units are twisted. A secondary coating (ultraviolet setting resin) 25 is applied on the seven sub-units 22, and a porous layer (foamed polyethylene) 26 is applied on the secondary coating 25. The optical fiber unit 21 was manufactured so that the diameter of the primary coating 24 was 0.5 mm$\phi$, the diameter of the secondary coating 25 was 2.7 mm$\phi$, and the outer diameter of the optical fiber unit 11 was 4.2 mm$\phi$.

As to the optical fiber units 11 and 21, the increase of transmission-loss at the time of low-temperature and the pressure-sending characteristic were evaluated by the same method as that in the fist embodiment. Part of the results is shown in the following table.

TABLE

| | Optical fiber unit 11 | | Optical fiber unit 21 | |
| --- | --- | --- | --- | --- |
| Twist pitch (mm) | Increase of low temperature transmission loss (dB/km) | Time for pressure-sending (min) | Increase of low temperature transmission loss (dB/km) | Time for pressure-sending (min) |
| 600 | 0.01 | 13 | 0.03 | 19 |
| 800 | 0.26 | 24 | 0.60 | 34 |

The results in the table confirm that the characteristics of the optical fiber units 11 and 21 are significantly altered in a range of twist pitch from 600 mm to 700 mm similar to the optical fiber unit 1.

Although it was estimated through the results that a winding-up diameter and a twist pitch are related to each other, the necessary pitch of twist is considerably small compared with 78.5 cm of a circumferential length, and it is difficult to clearly make the range of the pitch relate to the latter. It is estimated that a bend due to another factor exists in the optical fiber unit so as to cause influence therein.

Although three embodiments have been described as the embodiments of the present invention, various kinds of materials and configurations may be employed in the scope of the present invention. Various types of modifications will now be described.

As the material of the primary coating, setting-type resin, which shrinks at the time of hardening, and thermoplastic resin, which shrinks in a cooling step after extrusion, are suitable in order to tightly press optical fibers. A tape-like material (for example, a tape made of polyethylene terephthalate or unwoven cloth, or the like) may be used in view of separability. As the secondary coating material, on the other hand, resin which has low viscosity so as to flow into gaps among sub-units is useful because it is necessary to gather sub-units different in shape from each other. A resin having a modulus of elasticity lower than that of the primary coating is preferable in order to lessen the influence due to the low-temperature shrinkage of the porous layer. For such reasons, as employed in the embodiments, it is possible to use a combination in which nylon and ultraviolet setting resin are used as the primary and secondary coatings respectively, or the like.

The structures of the optical fiber units according to the present invention can be selected taking the number of necessary optical fiber cores, the form of branches, etc. into consideration. Further, in the optical fiber units according to the present invention, large drag never acts at the time of laying in view of the use, so that it is unnecessary to use an interposition quadrat, for example such as a tension body for maintaining rigidity. In the case where the optical fiber unit is laid in a substantially linear duct line, however, the optical fiber unit having higher rigidity can be laid easily, and in such a case, therefore, high elastic wire material such as liquid crystal fiber or the like may be arranged in the gap among the gathered sub-units.

Further, according to the present invention, a large effect can be obtained when the present invention is applied to a case where three-core sub-units which provide a considerably high symmetrical property as an optical fiber unit having a comparatively large number of cores are gathered to constitute a nine-core optical fiber unit, or a case of an optical fiber unit has more cores.

On the other hand, with respect to the number of cores per sub-unit, as a structure in which optical fibers can be brought into close contact with each other and in which disorder of arrangement or the like is hardly caused, a sub-unit having not less than seven cores, such as, a seven-core arrangement in which six optical fibers are arranged around one central optical fiber, shows a particularly stable characteristic.

As specifically described above with the embodiments, according to the present invention, a plurality of sub-units, each having a plurality of optical fibers, are twisted. A secondary coating is applied onto the twisted sub-units, and a porous layer is applied onto the secondary coating. Accordingly, the number of cores can be increased, and good pressure-sending characteristic can be obtained.

We claim:

1. An optical fiber unit for laying and pushing forward into a previously laid duct line by means of a flow of fluid pressure-sent into said duct line, said optical fiber unit comprising:

a plurality of sub-units each of which is formed of a plurality of optical fibers gathered and coated with a primary coating, wherein said plurality of sub-units is twisted;

a secondary coating applied over said plurality of sub-units; and a porous coating coated on said secondary coating.

2. An optical fiber unit as claimed in claim 1, wherein each of said plurality of sub-units includes seven optical fibers.

3. An optical fiber unit as claimed in claim 1, wherein each of said plurality of sub-units includes four optical fibers.

4. An optical fiber unit as claimed in claim 1, wherein each of said plurality of sub-units includes three optical fibers.

5. An optical fiber unit as claimed in claim 1, wherein said plurality of sub-units have a twist pitch in the range from 30 to 600 mm.

6. An optical fiber unit as claimed in claim 5, wherein the twist pitch of said plurality of sub-units is in the range of from 200 to 500 mm.

7. A method of forming an optical fiber unit, said method comprising the steps of:

encasing a plurality of optical fibers in a primary coating, and thus forming a sub-unit;

twisting a plurality of sub-units together;

forming a secondary coating layer around said twisted plurality of sub-units; and coating a porous layer over said secondary coating.

8. A method as in claim 7, wherein said twisting step includes imparting a twist pitch in the range of from 30 to 600 mm to said plurality of sub-units.

* * * * *